Figure 1:
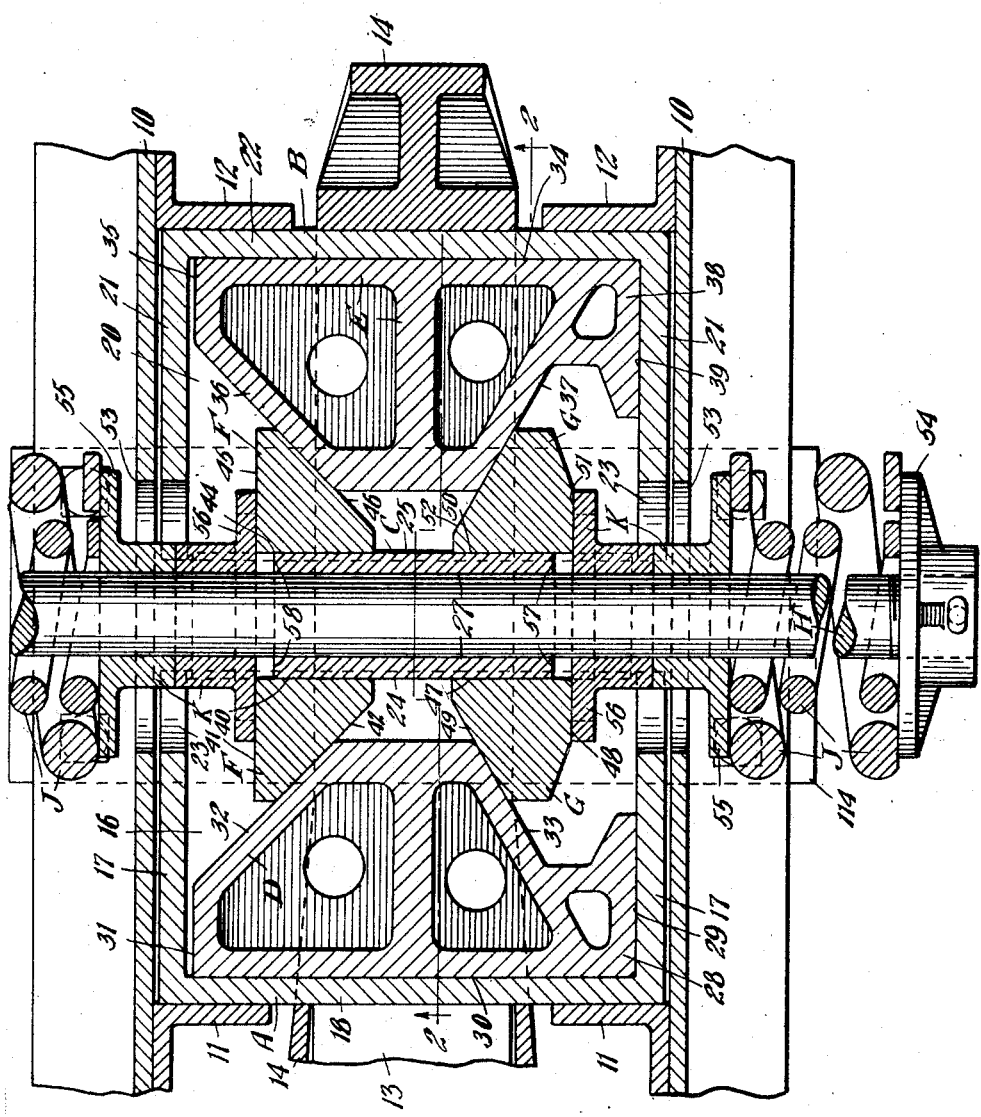

Jan. 5, 1926.  1,568,292
J. F. O'CONNOR
FRICTION SHOCK ABSORBING MECHANISM
Filed April 12, 1923   2 Sheets-Sheet 1

Witnesses
Wm. Geiger

Inventor
John F. O'Connor
By George J. Haight
His Atty.

Jan. 5, 1926.　　　　　　　　　　　　　　　　1,568,292
J. F. O'CONNOR
FRICTION SHOCK ABSORBING MECHANISM
Filed April 12, 1923　　2 Sheets-Sheet 2
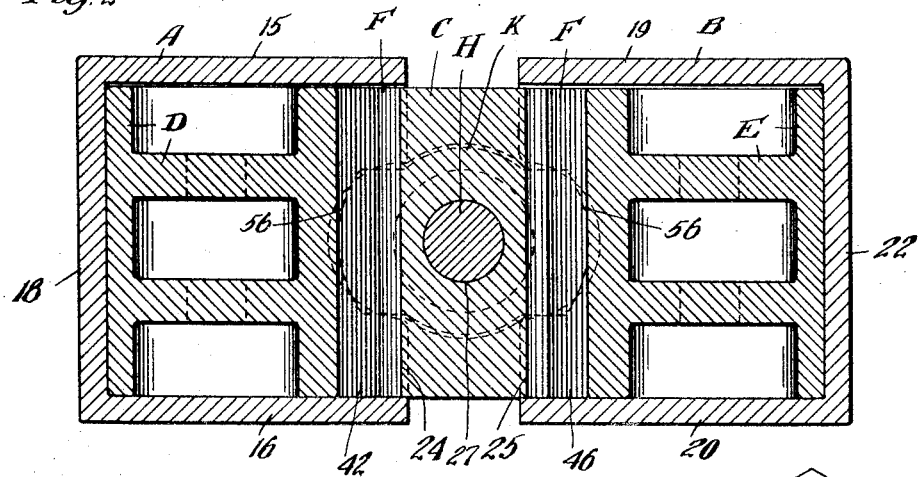
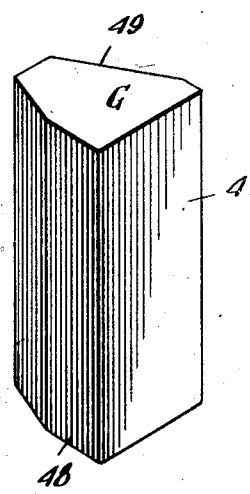
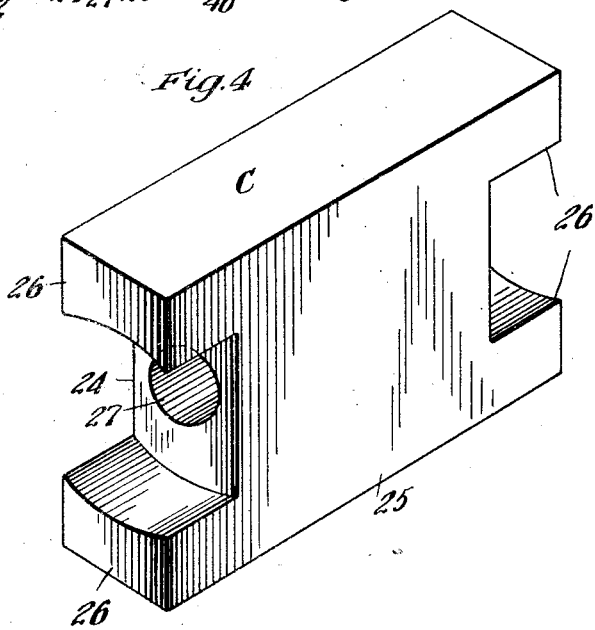
Witnesses
Inventor
John F. O'Connor
By George J. Haight
His Atty.

Patented Jan. 5, 1926.

1,568,292

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed April 12, 1923. Serial No. 631,507.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, which is of simple construction, can be cheaply manufactured, is provided with large friction wedging areas and of high capacity.

A further object of the invention is to provide a friction shock absorbing mechanism of the type indicated, comprising wedges and side friction shoes having co-acting wedge faces extending at relatively blunt and keen angles with reference to the direction of the application of the actuating forces, whereby easy release of the mechanism is assured.

A more specific object of the invention is to provide a friction shock absorbing mechanism, including a pair of follower acting casings; a transversely extending central friction member; a plurality of spring-resisted side friction elements having faces extending at blunt and keen wedge angles with reference to the longitudinal axis of the gear and friction faces co-acting with said central friction member; and wedge blocks co-acting with said follower casings, having wedge faces co-acting with said side friction shoes, wherein the wedge blocks have no transverse movement relative to the shells, thereby preventing destructive wear of the latter.

Other objects and advantages of the invention will more clearly appear from the description and claims hereinafter following.

In the drawings forming a part of this specification, Figure 1 is a horizontal, longitudinal sectional view of a portion of a railway draft rigging showing my improvements in connection therewith. Fig. 2 is a longitudinal, vertical sectional view corresponding substantially to the line 2—2 of Fig. 1. Fig. 3 is a detail perspective view of one of the side wedge friction shoes. And Fig. 4 is a detail perspective view of the central friction element.

In said drawings, 10—10 indicate channel draft sills of a railway car underframe, to the inner faces of which are secured front stop lugs 11 and rear stop lugs 12. The inner end portion of the draw-bar is indicated at 13. A hooded yoke 14 is attached to the draw-bar 13 and the shock absorbing mechanism proper is operatively disposed within said yoke. The movable parts of the draft rigging are supported in operative position by the detachable saddle plate 114.

The shock absorbing mechanism proper comprises, broadly, a front follower casing A; a rear follower casing B; transversely extending central element C; a front wedge block D; a rear wedge block E; a pair of blunt angled side wedge friction shoes F—F; a pair of keen angled side wedge friction shoes G—G; a transversely extending bolt H; a pair of spring resistance elements J—J, one at the outer side of each draft sill; and a pair of two-part spring followers or spools K—K.

The front and rear follower casings A and B are each of hollow box-like construction. The front follower casing A is provided with spaced top and bottom walls 15 and 16, spaced side walls 17—17 and a transverse, vertically extending, front end wall 18. The front end wall 18 is adapted to co-act with the front stop lugs 11—11 in a well known manner. The rear follower casing B is provided with spaced top and bottom walls 19 and 20, spaced side walls 21—21 and a transversely extending, vertical, rear end wall 22 adapted to co-act with the stop lugs 12—12. The inner ends of the front and rear followers are normally spaced apart a proper distance to permit the desired compression movement of the mechanism, but are adapted to abut and act as stops when the gear is fully compressed, the force being then transmitted directly through the followers to the stop lugs on the draft sills. As clearly shown in Fig. 1, the inner ends of the side walls of both followers are recessed as indicated at 23, to provide proper clearance for the spools K, when the gear is fully compressed, so that their lateral movement will not be interfered with.

The friction element C is disposed transversely of the mechanism centrally between the front and rear followers A and B, and is of a height substantially equal to the distance between the top and bottom walls of the followers, and the inner ends of the top, bottom and side walls of the followers are adapted to slightly overlap the front and rear edges of the same when the parts are in normal position as clearly shown in Fig. 1. The element C is provided with a flat front friction surface 24 and a flat rear friction face 25. At its opposite ends, the element C is provided with spaced lugs 26—26, extending transversely of the mechanism and adapted to loosely embrace the flanges of the inner parts of the two-part spools C, the inner faces of said lugs being curved corresponding with the curvature of the spool flanges. The element C is also provided with a central bore 27, extending transversely of the mechanism and adapted to receive the bolt H.

The wedge D associated with the front follower shell A is of hollow construction as clearly shown in Figs. 1 and 2, extends from the top to the bottom wall of the follower and is provided with a lateral projection 28 having a flat face 29 adapted to co-act with one of the side walls 17 of the casing, to limit the lateral movement of the wedge D. The wedge D proper, is provided with a flat front face 30, a flat side face 31, a flat face 32 extending at a relatively blunt angle with reference to the longitudinal axis of the mechanism, and a flat face 33 extending at a relatively keen angle with reference to said axis. The flat face 30 is adapted to abut the front end wall 18 of the follower casing A, and the flat face 31 is adapted to limit the lateral movement of the wedge by engagement with the adjacent side wall 17.

The wedge E associated with the follower B is of a construction similar to the wedge D, having a flat rear face 34, adapted to co-act with the rear wall 22 of the follower, a flat face 35 adapted to co-act with the adjacent side wall 21 of the follower, a flat face 36 extending at a blunt angle with reference to the longitudinal axis of the mechanism, a flat face 37 extending at a keen angle with reference to said axis, and is also provided with a lateral projection 38, similar to the projection 29 of the wedge D, having a flat face 39 adapted to co-act with the adjacent side wall 21 of the follower B to limit the lateral movement of the wedge.

The side friction shoes F are of a height equal to that of the friction element C, are two in number and are disposed at one side of the mechanism, on opposite sides, in front of and to the rear of the friction element C. The front and rear friction shoes F are disposed within the follower casings and are supported respectively by the bottom walls 16 and 20 thereof. The front friction wedge shoe F is provided with a flat rear face 40 adapted to slide on the friction face 24 of the member C, a flat side face 41 adapted to co-act with one of the two-part spools K, and a flat wedge face 42 correspondingly inclined to the face 32 of the wedge D and co-acting therewith. The rear wedge friction shoe F is also provided with a flat face 44 adapted to co-act with the face 25 of the element C, a flat face 45 adapted to co-act with the adjacent spool K, and a wedge face 46 correspondingly inclined to the wedge face 36 of the wedge E and co-acting therewith.

The side friction shoes G are two in number, and are also of a height equal to that of the friction element C and are disposed on opposite sides, in front of and to the rear of the element C. The friction wedge shoes G are housed within the front and rear follower shells respectively, and are supported by the bottom walls 16 and 20 thereof. The front wedge friction shoe G is provided with a flat rear face 47 adapted to co-act with the front friction face 24 of the element C; a flat side face 48 adapted to co-act with the adjacent spool K, and a wedge face 49 correspondingly inclined to the wedge face 33 of the block D and co-acting therewith. The rear wedge friction shoe G is provided with a flat face 50 adapted to co-act with the rear friction face 25 of the element C, a flat side face 51 adapted to co-act with the adjacent spool K, and a wedge face 52 correspondingly inclined to the wedge face 37 of the block E and adapted to co-act therewith. Upon reference to Fig. 1, wherein the parts are shown in the normal fully released position, it will be seen that the wedge faces on the wedges and shoes are so disposed that each pair of shoes F and G is spaced equally from the longitudinal center plane of the gear, and that the front end of the wedge face 33 and the rear end of the wedge face 37 of the wedges D and E are thereby spaced a greater distance from the adjacent side wall of the follower than the corresponding portion of the faces 32 and 36 of said wedges. The side projections 28 and 38 of the wedges D and E are recessed as shown to accommodate the outer ends of the wedge shoes G to permit full, unobstructed movement of the latter during the compression of the mechanism.

The bolt H extends transversely through the mechanism, being received in the bore 27 of the member C and projecting through relatively large openings 53 in the draft sills 10 and outwardly beyond the draft sills. The openings 53 in the draft sills are provided to permit the free movement of the bolt H and the spools K longitudinally of the gear during compression of the mechanism.

Relative separating movement of the pairs of friction wedge shoes F and G is opposed by the spring resistance elements J at opposite sides of the mechanism. Each of the spring resistance elements J is interposed between a collar 54 fixed to one end of the bolt H and the flange 55 of the outer part of one of the two parts spring followers or spools K. In Fig. 1, only one of the collars 54 is shown, the bolt H being broken away at the upper end of that figure to accommodate the view to the sheet of the drawing. The spring followers or spools K are slidably mounted on the bolt H and the innermost part of each of the two part spools K is provided with a flange 56, embraced by and working between the adjacent lugs 26 of the element C. The flanges 56 of the spools are elongated forwardly and rearwardly as clearly shown in dotted lines of Fig. 2 so as to provide larger bearing surface to co-act with the flat outer faces of the adjacent wedge friction shoes F and G, the flanges of the spool at one side of the mechanism bearing on the flat faces 48 and 51 of the front and rear shoes G, and the flange of the spool at the other side bearing on the flat faces 41 and 45 of the front and rear shoes F. As clearly shown in Fig. 1, a space is left between the spools K and the adjacent ends of 57 and 58 of the member C, to compensate for wear of the parts. In this connection it is also pointed out that the recesses 53 in the draft sills are of sufficient size to permit the necessary free movement of the bolt and spools longitudinally of the sills during the operation of the mechanism.

Assuming an inward or buffing movement of the drawbar, the operation of the mechanism is as follows. The wedge D will be moved inwardly with the front follower toward the rear wedge E forcing the front wedge friction shoes F and G apart laterally, at the same time forcing the transverse friction element C and the rear friction wedge shoes F and G rearwardly at a lower rate than the movement of the wedge D, thereby causing the wedge E to spread the rear wedge friction shoes F and G apart laterally to an extent corresponding with the lateral movement of the front shoes, and compressing the springs J. During the described action, in addition to the friction created between the wedge faces of the wedge shoes and wedges, friction will also be created between the friction faces of the wedge shoes F and G and the faces 24 and 25 of the friction element C on which the wedge shoes slide laterally. It will be evident that due to the blunt angles with reference to the longitudinal axis of the gear, of the faces 32 and 36 of the wedges D and E, and the co-acting faces 42 and 46 of the shoes F, the lateral movement of the shoes F relatively to the wedges D and E during a given compression movement of the wedges D, will be greater than that of the shoes G, although the extent of travel of the wedge shoes F and G on the co-acting wedge faces during this time will be equal. The inward movement of the follower A will be arrested upon engagement of the top, bottom and side walls thereof with the inner ends of the corresponding walls of the rear follower B, the parts being so proportioned that this will occur before the springs J have been driven solid, the force then being transmitted directly through the followers A and B to the stop lugs.

During draft, the action will be the reverse of that just described, the rear wedge E being moved forwardly with the rear follower B, the front follower A and wedge D being held stationary.

In release, due to the more acute angle obtaining between the co-acting wedge faces of the wedge shoes F and the wedges D and E, with respect to the inwardly directed reactive forces from the springs, than obtains with respect to the wedge faces of the wedge shoes G and said wedges, the initial action will be a movement of the wedge shoes F on the wedges D and E, forcing the latter outwardly and breaking the frictional resistance between the co-acting faces of the wedges and the shoes G, whereupon the springs will act to restore all of the parts to normal full released position. Any tendency of the wedge faces of the shoes G and the wedges to stick will be thus effectively overcome, and quick and certain release of the mechanism assured, each of the shoes G being adapted to move outwardly a limited distance with the respective wedges, the flat faces 48 and 51 of the shoes sliding on the inner flat face of the flange 56 of the adjacent spool K.

It will be evident that the angularity of the keen and blunt wedge faces of the wedges and shoes may be varied within certain limits and yet accomplish the desired result; the same preferably, however, have an angularity of 30 and 45 degrees, respectively, with reference to the longitudinal axis of the gear.

From the preceding description it will be evident that I have provided a gear of exceedingly simple construction, composed of few parts, in which the parts are automatically held in centered position, wherein there is no appreciable wear on the housing in that the wedge blocks which engage the housing have no transverse movement therein, and in which the release, because of the blunt angles which first come into action, is made more certain than heretofore in mechanisms of this general class.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with end followers movable relatively toward each other; of end wedges movable with the respective followers; a central friction element having friction faces extending transversely to the axis of the mechanism; a plurality of friction shoes co-acting with said wedges, and slidable on the friction faces of said element, said shoes being separable transversely of the mechanism; and means for yieldingly opposing relative movement of said friction shoes, said means including spring elements, each of which is adapted to engage a plurality of said friction shoes.

2. In a friction shock absorbing mechanism, the combination with end followers movable relatively toward each other; of end wedges movable with the respective followers; a central friction element having friction faces extending transversely to the axis of the mechanism; a plurality of friction wedge shoes co-acting with said wedges and slidable on the friction faces of said element, said shoes being separable transversely of the mechanism; and spring means disposed exteriorly of the shoes for resisting the movement of said shoes.

3. In a friction shock absorbing mechanism, the combination with end followers movable relatively toward each other; of end wedges movable with the respective followers, each of said wedges having faces extending at relatively blunt angles and other faces extending at relatively keen angles with reference to the longitudinal axis of the gear; a central friction element; a plurality of wedge friction shoes co-acting with said element and wedges, having wedge faces correspondingly inclined to and adapted to co-act with the keen wedge faces of said shoes, the remaining shoes having wedge faces correspondingly inclined to and co-acting with the blunt wedge faces of said wedges, said shoes being separable at right angles to the axis of the mechanism; and spring resistance means for opposing movement of the shoes.

4. In a friction shock absorbing mechanism, the combination with end followers movable relatively toward each other; of end wedges movable with the respective followers, each of said wedges having wedge faces extending at relatively blunt angles and other faces extending at relatively keen angles with reference to the longitudinal axis of the gear; a central friction element having friction faces extending transversely to the axis of the mechanism; a plurality of wedge friction shoes co-acting with said wedge faces, said shoes being slidable on the friction faces of said element, certain of said shoes having wedge faces correspondingly inclined to and adapted to co-act with the keen wedge faces of said wedges, the remaining shoes having wedge faces correspondingly inclined to and adapted to co-act with the blunt wedge faces of said wedges, said shoes being separable transversely of the axis of the mechanism; and spring resistance means opposing movement of said shoes.

5. In a friction shock absorbing mechanism, the combination with end followers movable relatively toward each other; of end wedges movable with the respective followers; front and rear side friction shoes co-acting with said wedges, said shoes having wedge faces substantially co-extensive with the faces of said end wedges being separable transversely of the mechanism; a central friction element, said friction element and shoes having co-operating friction surfaces extending transversely of the axis of the mechanism; and spring elements resisting separating movement of said friction shoes.

6. In a friction shock absorbing mechanism, the combination with end followers movable relatively toward each other; of end wedges movable with the respective followers, each of said wedges having wedge faces extending at relatively blunt angles and other faces extending at relatively keen angles with reference to the longitudinal axis of the mechanism; front and rear side friction shoes. said shoes being separable transversely of the mechanism, certain of said shoes having wedge faces correspondingly inclined to and co-acting with the keen wedge faces of said wedges, and the remaining shoes having wedge faces correspondingly inclined to and co-acting with the blunt wedge faces of said wedges; a central friction element, said friction element and shoes having co-operating friction surfaces extending transversely to the axis of the mechanism; and spring elements resisting separating movement of said friction shoes.

7. In a friction shock absorbing mechanism, the combination with end follower shells movable relatively toward each other and adapted to abut when the mechanism is fully compressed, of end wedges movable with the respective followers, a central friction element having friction faces extending transversely to the axis of the mechanism; a plurality of friction wedge shoes co-acting with said wedges and slidable on the friction faces of said element, said shoes being separable transversely of the mechanism; and spring means resisting the movement of said shoes.

8. In a friction shock absorbing mechanism, the combination with front and rear followers; of end wedges movable with the respective followers, each of said end wedges being formed with a wedge face extending at a relatively keen angle with reference to the longitudinal axis of the gear and a wedge face extending at a relatively blunt angle with reference to said axis; a central friction element; a pair of friction shoes having friction faces co-acting with the friction element and wedge faces correspondingly inclined to the blunt wedge faces of said wedges and co-acting therewith; a second pair of friction shoes having friction faces co-acting with the friction element and wedge faces correspondingly inclined to the keen wedge faces of said wedges and co-acting therewith; and spring elements resisting relative lateral movement of said shoes.

9. In a friction shock absorbing mechanism, the combination with front and rear followers; of end wedges movable with the respective followers, each of said end wedges being provided with a wedge face extending at a relatively keen angle with reference to the longitudinal axis of the gear and a wedge face extending at a relatively blunt angle with reference to said axis; a transversely disposed central friction element; a pair of friction shoes having friction faces co-acting with said element and wedge faces correspondingly inclined to the blunt wedge faces of said wedges and co-acting therewith, said shoes being disposed on opposite sides of said element; a second pair of friction shoes having friction faces co-acting with said element and wedge faces correspondingly inclined to the keen wedge faces of said wedges and co-acting therewith, said last named shoes being also disposed on opposite sides of said element; and yielding means for opposing relative movement of said shoes.

10. In a friction shock absorbing mechanism, the combination with front and rear followers movable relatively toward each other; of front and rear wedges movable with the respective followers, said wedges each having a pair of wedge faces; a transversely disposed central friction element; a plurality of separable friction shoes, each having a wedge face co-operating with one of the faces of one of said wedges, said shoes being arranged in pairs at opposite sides of the mechanism, and the shoes of each pair being arranged on opposite sides, in front of and to the rear of said element and having friction faces co-operating therewith, the co-acting wedge faces of said wedges and one of said pairs of shoes extending at relatively blunt angles with reference to the longitudinal axis of the mechanism, and the co-acting wedge faces of said wedges and the remaining pair of shoes extending at relatively keen angles with reference to said axis; and means for yieldingly resisting the lateral movement of said shoes.

11. In a friction shock absorbing mechanism, the combination with a friction element having transversely disposed friction surfaces; of a follower movable toward and away from said friction element; of a wedge movable with said follower, said wedge being provided with a plurality of wedge faces; a plurality of friction shoes arranged to co-act with the friction surfaces of said friction element, said shoes having wedge faces co-operating with the faces of the wedge, certain of said co-operating faces being disposed at relatively blunt angles with reference to the longitudinal axis of the mechanism, and the remaining co-operating faces being disposed at relatively keen angles to said axis; and means for yieldingly opposing movement of said friction shoes, the direction of force exerted by said means being at an angle to the longitudinal axis of the mechanism.

12. In a friction shock absorbing mechanism, the combination with relatively movable front and rear followers; a wedge movable with each follower, each wedge having relatively a blunt and a keen wedge face with reference to the line of movement of said wedge, the blunt wedge faces of said wedges being at one side of the mechanism and the keen wedge faces of said wedges being at the opposite side of the mechanism; a plurality of laterally movable friction shoes co-acting with said friction element, said friction shoes having faces correspondingly disposed to and co-acting with the faces of said wedges, and means arranged to oppose movement of said friction shoes, the direction of force of said means being at an angle to the movement of said wedges.

In witness that I claim the foregoing I have hereunto subscribed my name this 10th day of April, 1923.

JOHN F. O'CONNOR.